United States Patent Office 3,482,938
Patented Dec. 9, 1969

3,482,938
METHOD FOR SEPARATING IRON FROM MAGNESIUM HYDROXIDE
Remigius A. Gaska, Midland, and Robert A. Canute, Mount Pleasant, Mich., assignors to The Dow Chemical Company, Midland, Mich., a corporation of Delaware
No Drawing. Filed Nov. 29, 1967, Ser. No. 686,768
Int. Cl. C01f 5/14
U.S. Cl. 23—201                          10 Claims

ABSTRACT OF THE DISCLOSURE

This specification discloses a method for reducing the iron content of magnesium hydroxide derived from inland brines and sea water as sources of magnesium and comprises subjecting a lime containing source, e.g., calcined lime (calcium carbonate), or calcined dolomite calcium and magnesium carbonate mixtures), which are the primary sources of the contaminating iron, to a reducing atmosphere at high temperatures, and then precipitating magnesium hydroxide, e.g., from brine and exposing the precipitator slurry during or after precipitation to the influence of a magnetic field. The iron-rich particles, which are normally larger in size than the magnesium hydroxide precipitated particles, are attracted by the applied magnesium and can then be separated from the system.

BACKGROUND OF THE INVENTION

The field of the present invention concerns the art of preparing magnesium hydroxide.

Various iron oxides appear in magnesium hydroxide products as impurities in vary small or trace amounts. The main source of iron in the precipitated magnesium hydroxide from brines and sea water is high calcuim or dolomitic lime source materials. Moreover, it is quite difficult to remove this iron impurity from magnesium hydroxide once it has been precipitated. Accordingly, it is preferable to remove the iron impurities to the extent possible from the various reactants before or during precipitation of the magnesium values as magnesium hydroxide. A magnesium hydroxide product which is very low in this iron impurity or essentially free thereof is highly desirable for certain applications and uses, such as, for example, pharmaceutical products.

A primary object of the present invention, therefore, is to provide a novel process in the production of magnesium hydroxide from various inland and artificial brines and from sea water for removing or reducing the iron impurity in said magnesium hydroxide as derived from a lime containing precipitant, thereby to provide a magnesium hydroxide product essentially or reasonably free of such impurity.

BRIEF SUMMARY OF THE INVENTION

It has been discovered that the iron content conventionally found as an impurity in precipitated magnesium hydroxide can be reduced or eliminated by empolying a lime or dolomitic lime source material as a precipitant to precipitate magnesium from brines or sea water containing magnesium chloride which has been subjected to a reducing atmosphere at high temperatures within the range of from about 900 to 1200° C., and carrying out the precipitation of said magnesium hydroxide with the so-reduced lime under the influence of a magnetic field of appropriate strength. By so-doing, the iron rich particles migrate under the influence of the magnetic field to the magnets in the precipitator zone and thus can be separated from the system. The iron may also be separated by subsequently exposing the precipitator slurry to the influence of a magnetic field, e.g., just prior to filtration. As an additional optional embodiment of the invention the lime-containing precipitant material in a slaked or unslaked dry or slurry form may also be exposed to a magnetc field prior to contacting the precipitant with the magnesium ion source.

DETAILED DESCRIPTION OF THE INVENTION

In carrying out the novel process of the present invention to obtain the above recited and other objects and advantages of the invention, a lime source material such as, e.g., limestone, or dolomitic limestone which is an essentially equimolar mixture of calcium and magnesium carbonate, or sea shells is calcined at not over about 1450° C. to form the corresponding oxides. Such calcination ordinarily is carried out at a temperature within the range of from about 1300 to about 1450° C. in a rotary kiln. Other suitable equipment may be used as well. The calcined lime, or calcined dolomite called dolime, is then subjected to a reducing atmosphere of gases. Exposing the lime or dolime to said reducing atmosphere may be conveniently carried out at or near the exit end of the rotary kiln inasmuch as the reduction of the material should be carried out at a temperature of from about 900° to about 1200° C. and the dolime will normally have cooled down to this temperature range upon reaching this portion of the kiln. By exposure to the reducing atmosphere at the temperature described the various iron oxides, such as for example, ferric oxide and ferrous oxide are reduced to elemental iron. The lime or dolime so-reduced is fed to a slaking device wherein it is admixed with either water or a calcium chloride-containing slaking liquid to convert or hydrate the calcuim oxide portion of the dolime to calcium hydroxide. The slaked dolime, together with a magnesium chloride-containing inland brine, for example, is next introduced into a precipitator vessel or other precipitator zone wherein the magnesium values in the brine react with the calcium hydroxide to precipitate during agitation or mixing of the reaction mixture magnesium hydroxide in suspension which is readily filterable from its mother liquor. In the preferred embodiment of the invention, the precipitation step as described is characterized by being accomplished under the influence of a magnetic field, such as for example, by employing a magnet of suitable size and strength of field in the precipitator vessel which attracts the iron particles to the appropriate magnetic pole where said particles are collected and subsequently removed by cleaning the magnet. A magnesium hydroxide precipitate product is thereby obtained greatly reduced or possibly essentially free of any iron impurity. The low iron magnesium hydroxide product may then be recovered by separation from the mother liquor such as for example by vacuum filtration means, such as, for example, a Moore filter system.

While calcined lime as well as calcined dolomite may be used in the present invention, the latter, called dolime, has certain inherent advantages over the use of calcined lime. Such advantages include a higher yield of magnesium hydroxide inasmuch as dolime normally contains about one mole of magnesium oxide per mole of calcium oxide and therefore when reacted with a magnesium chloride-containing brine, the magnesium oxide becomes hydrated and yields substantially two times the amount of magnesium hydroxide which would be reproduced from a reaction of calcined limestone with an equal quantity of the brine. Moreover, dolomite is relatively plentiful.

In effect, the present invention provides an improvement to conventional brine and sea water derived magnesium hydroxide production processes which employ a lime-based precipitant by including the steps of subjecting the calcined lime or dolime, or lime source material such as sea shells, to a reducing atmosphere as described together with the provision of carrying out the precipitation of magnesium hydroxide under the influence of a magnetic field. In substantially all other specifics the process steps and conditions are essentially as employed in the art, as may be illustrated and described in U.S. Letters Patent 3,080,215. This patent relates to the production of magnesium hydroxide from inland brines employing lime and dolomite as a precipitant. Another means for producing magnesium hydroxide from brines is described in U.S. Patent 3,305,311. Various so-called sea water based processes are also amendable to the improvement of the present invention for reducing the iron impurities in magnesium hydroxide products.

In general, exposure of the lime or dolime material to the reducing atmosphere in accordance with the present invention should take place after essentially complete calcination of the raw stone to the oxide, and at a temperature within the range of from about 900° C. to about 1250° C., preferably a temperature within the range of from about 1000 to 1200° C. An ideal or convenient time or place for reduction of the calcined material is at a point near the end or immediately following the calcining step. At this point the calcined material usually has cooled to a temperature within the range aforesaid where at exposure the reducing atmosphere may be accomplished. It should also be understood, however, that such exposure may be carried out in a separate step as well wherein the calcined dolime, for example, may be reheated to the appropriate temperature of 900 to 1250° C. Such a separate step, however, would have economic disadvantages.

The reducing atmosphere actually employed may be one of several classical reducing gaseous atmospheres. Such an atmosphere is one which has the capability of taking oxygen away from the iron oxides present in the calcined dolime or lime at the elevated temperature indicated, thereby leaving essentially elemental iron preferably in a large particle size. Specific examples of operable reducing gaseous atmospheres may be carbon monoxide and hydrogen. Furthermore, the reducing atmosphere need not be essentially pure carbon monoxide or hydrogen; for example, it may be a gas containing predominant amounts of a reducing gas, preferably containing at least 70% of such reducing gases. It may be possible, depending on the $CO_2$ content, to employ the gaseous effluent from the calcining kiln if it contains predominant amounts of said carbon monoxide. In any event, a suitable reducing atmosphere at a sufficiently elevated temperature must be employed in the method of the present invention such as to reduce essentially if not all of the iron oxides in the lime-containing calcined material to elemental iron.

With respect to precipitating the magnesium values from a brine or sea water source using slaked lime, calcined sea shells, marine life shells or dolime and the like, as the precipitant, this is accomplished in accordance with the present invention, by carrying out such precipitation preferably in a precipitating zone under the influence of a magnetic field having a strength of, for example, 10 gausses to about 25,000 gausses. Another method of iron removal is where the magnetic field or exposure is applied to the precipitator slurry after precipitation of the $Mg(OH)_2$ has taken place, e.g., in the discharge line leading from the precipitator vessel. Accordingly, the application of magnetic field can be proportioned to the size precipitator being used whether it be a low volume precipitator vessel or extremely high volume precipitator vessel. The required strength of the magnetic field will in general be proportional in a direct manner to the amount of iron to be recovered from the system. That is, as the strength of the magnetic field is increased on the precipitator vessel content, the amount of iron recovered will increase correspondingly until all magnetic material is removed. The minimum required magnetic field will be dependent upon the point at which an improvement in reduction of iron impurity is realized, and as a maximum limited only by the economics of the operation in applying such magnetic field influence.

Any suitable means may be employed to accomplish application of the magnetic field. For example, magnetic poles may be established at opposite points in the precipitator so as to obtain an effective migration of the iron rich impurity particles to the appropriate pole while aided by agitation. Other suitable and preferred means may include, for example, installation of one or more recycle flow lines carried by or in communication with the precipitator which would be equipped with a magnetic field wherein the recycle line or lines continuously circulate the reactants out of and back into the main precipitating zone, and/or generally recycles the reactants from one part of the precipitating zone to another. In such a manner the size of the magnet would be smaller while maintaining the same field strength. In general, application of the magnetic field in the precipitator may be carried out using the ordinary and conventional techniques as may be employed by those skilled in the art. Application of the magnetic field may also be accomplished in a separate vessel or zone apart from the precipitator zone if convenient or desired, subsequent to the precipitation step.

A specific embodiment of the improvement of the present invention wherein dolomite is calcined at from 1150 to 1450° C., to produce dolime, slaking the dolime with a slaking liquid comprising an aqueous calcium chloride solution substantially free of magnesium ions and the liquid portion thereof having a specific gravity of at least 1.07, at a temperature of between 40° and 90° C. for at least about 4 minutes, to produce a slaked dolime slurry, and intermixing the dolime slurry so-produced with an aqueous brine containing at least about 2% by weight of magnesium chloride for a mixing period of at least about 2 hours at a temperature of between 40° and about 80° C., the amount of the dolime slurry being sufficient to provide more than one mole of calcium hydroxide per mole of magnesium chloride to produce magnesium hydroxide suspended in a calcium chloride-containing brine, and recovering the thus produced magnesium hydroxide; comprises the improvement of subjecting the calcined dolomite, or dolime, prior to slaking, to a reducing gaseous atmosphere while being agitated or mixed at a temperature of from about 900° to about 1200° C. and accomplishing said intermixing of the dolime slurry with the magnesium chloride-containing brine in a precipitator vessel under the influence of a magnetic field having a strength of from 10 to about 25,000 gausses. By means of this improvement a magnesium hydroxide product is obtained having a significantly reduced iron impurity content than obtained in conventional magnesium hydroxide products obtained from processes not employing the improvement of the present invention.

Similarly, the improvement of the present invention as described hereinbefore is also readily applicable to the slaking process disclosed in U.S. Patent 3,305,311, and to sea water based processes for producing $Mg(OH)_2$.

By employing the method and improvement of the present invention, reductions in the iron impurity in final magnesium hydroxide products may be very significant. Reductions in the order of from about 25 to 60%, based on the normal amount of iron impurity in conventionally prepared magnesium hydroxide, can be obtained, and typically reductions, using a field strength of 1000 gausses, of 30 to 50%.

Another embodiment of the present invention, which is applicable to both batch and continuous operations in the production of magnesium hydroxide, comprises the additional, but optional, step of applying a magnetic field to the calcined lime and/or dolime either while same is being subjected to the reducing atmosphere aforesaid or subsequently as a slaked aqueous slurry. The strength of the magnetic field applied will be generally in the order as applied in the precipitator vessel, hereinbefore described or greater. In general operations, therefore, as the iron oxides are reduced to elemental iron the magnetic field applied tends to cause migration of these elemental iron particles to the peripheral portions of the material mass or slurry as it is being agitated or moved toward the exit end of the rotary kiln or being transported, e.g., by pipe to the precipitating zone. Application of the magnetic field in this manner during, e.g., exposure of the dolime to the reducing atmosphere or as a slaked slurry enhances the overall reduction of the iron impurity in the final resulting magnesium hydroxide product. This embodiment is applicable to batch, semi-batch and continuous operations.

The following examples serve to further illustrate and provide specific embodiments of the present invention but are not to be construed as limiting the invention thereto.

Example

A sample of Cedarville dolomitic limestone was ground, heated to 925° C. and hydrogen gas passed through it for 3 hours. The lime bed used was one inch in diameter by twelve inches high and the $H_2$ gas flow rate was 1.5 cubic feet per hour.

The treated calcined stone or "dolime" was cooled to room temperature and divided into two parts for the following treatments:

(a) A first part of the dolime was subjected to the magnetic field induced by a permanent magnet of approximately 1000 gauss strength while being agitated.

(b) A second sample of dolime which had been slaked, employing a slight stoichiometric excess, was reacted with an aqueous brine containing about 20% $CaCl_2$, 3.5% $MgCl_2$, 5% NaCl, 1.5% KCl, and less than 2% total of other alkali metal and halide salts, to precipitate the magnesium values therein as a $Mg(OH)_2$ slurry dispersed in a mother liquor. The slurry was then subjected to the magnetic field induced by said magnet.

(c) The first portion was further treated by reacting same with Monroe brine under the same conditions and magnetic field of portion (b).

The first portion as treated in item (a) above underwent a reduction in iron content from 0.168% Fe to 0.162% Fe. The iron content in the precipitated and filtered $Mg(OH)_2$ was reduced by the above treatments as follows:

| $Mg(OH)_2$ Precipitated From | Wt. Ratio at Fe-to-Mg $(OH)_2$ in Cake | Percent Reduction in Fe Content |
| --- | --- | --- |
| Untreated lime | .00157 | No reduction |
| (b) | .00105 | 33 |
| (a) plus (c) | .000872 | 44.5 |

It can be seen from the example data and results that an extremely effective separation of iron from precipitated $Mg(OH)_2$ particles can be obtained with a modest magnetic strength by processing the precipitant, calcium oxide source, as taught in accordance with the present invention.

Such iron separation as obtained by means of the present invention is apparently accomplished at least in part by the unique combination of process steps and an unexpected agglomeration of the reduced iron and iron rich particles to a size and extent to permit such separation from the other smaller iron free or low iron-containing materials in the process.

The present invention may be modified and changed without departing from the spirit or scope thereof and it is understood that the invention is only limited as defined in the appended claims.

We claim:
1. In a method of producing magnesium hydroxide wherein a lime source material contaminated with iron is calcined to provide calcium oxide, the calcium oxide is slaked to convert it to calcium hydroxide as a precipitant to react by contact with magnesium ions in an aqueous medium in a precipitating zone to produce magnesium hydroxide, which is then separated from the reaction mixture; the improvement of reducing the iron impurity in said magnesium hydroxide comprising exposing the calcium oxide derived from calcining said iron-contaminated lime source material to an atmosphere of reducing gases in a concentration of said gases capable of reducing iron oxides to elemental iron, contacting the slaked calcium oxide so-exposed with the magnesium ions in an aqueous medium, and applying a magnetic field to said contacted materials, said field having a strength of from about 10 to about 25,000 gausses, thereby reducing the iron impurity in said magnesium hydroxide product.

2. The improvement of claim 1 including the additional step of applying a magnetic field to the so-exposed calcined lime source material prior to its contact with said magnesium ions.

3. In a method of producing magnesium hydroxide wherein a lime source material contaminated with iron is calcined to provide calcium oxide, the calcium oxide is slaked to convert it to calcium hydroxide as a precipitant to react by contact with an aqueous medium of magnesium ions in a precipitating zone to produce magnesium hydroxide, which is then separated from the reaction mixture; the improvement of reducing the iron impurity in said magnesium hydroxide comprising exposing the calcium oxide derived from calcining said iron-contaminated lime source material to an atmosphere of reducing gases and contacting the slaked calcium oxide so-exposed with the magnesium ions in an aqueous medium in at least one precipitating zone under the influence of a magnetic field having a strength of from about 10 to about 25,000 gausses, thereby reducing the iron impurity in said magnesium hydroxide product.

4. The method of claim 3 wherein the source material is limestone, dolomitic limestone or marine life shells.

5. The method of claim 3 wherein the calcined source material is subjected to an atmosphere of reducing gases comprising a predominant amount of hydrogen.

6. The method of claim 3 wherein the calcined source material is subjected to an atmosphere of reducing gases comprising a predominant amount of carbon monoxide.

7. The method of claim 3 wherein the precipitating zone comprises a precipitator vessel.

8. The method of claim 3 wherein the precipitating zone comprises at least one recycle flow line connected to a precipitator vessel for recycling the reactants out of and back into said vessel and wherein said magnetic field is applied to the recycle flow line.

9. The method of claim 3 wherein the magnetic field applied has a strength of at least about 1000 gausses.

10. The improvement of claim 3 including the additional step of applying a magnetic field to the so exposed calcined lime source material prior to its contact with said magnesium ions.

References Cited

UNITED STATES PATENTS

| 1,994,271 | 3/1935 | Church et al. | 23—66 X |
| 2,287,440 | 6/1942 | McCleary | 23—66 X |
| 2,520,850 | 8/1950 | Minnick | 23—66 |

OSCAR R. VERTIZ, Primary Examiner

G. T. OZAKI, Assistant Examiner

U.S. Cl. X.R.

23—186; 75—97